(12) United States Patent
Del Gatto

(10) Patent No.: US 11,954,035 B2
(45) Date of Patent: *Apr. 9, 2024

(54) CACHE ARCHITECTURES WITH ADDRESS DELAY REGISTERS FOR MEMORY DEVICES

(71) Applicant: Micron Technology, Inc., Boise, ID (US)

(72) Inventor: Nicola Del Gatto, Cassina de' Pecchi (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,129

(22) Filed: Oct. 18, 2022

(65) Prior Publication Data

US 2023/0100015 A1 Mar. 30, 2023

Related U.S. Application Data

(63) Continuation of application No. 16/891,635, filed on Jun. 3, 2020, now Pat. No. 11,481,330.

(51) Int. Cl.
*G06F 12/08* (2016.01)
*G06F 12/0842* (2016.01)
*G06F 12/121* (2016.01)

(52) U.S. Cl.
CPC ........ *G06F 12/0842* (2013.01); *G06F 12/121* (2013.01); *G06F 2212/1016* (2013.01); *G06F 2212/608* (2013.01)

(58) Field of Classification Search
None
See application file for complete search history.

(56) References Cited

U.S. PATENT DOCUMENTS

| 7,600,143 B1 * | 10/2009 | Neuman | G06F 7/06 713/500 |
| 9,734,066 B1 * | 8/2017 | Indupuru | G06F 12/128 |

(Continued)

FOREIGN PATENT DOCUMENTS

CN 104298622 A 1/2015

OTHER PUBLICATIONS

Chinese patent office, "China Office Action," issued in connection with China Patent Application No. 202110566320.3 dated Nov. 21, 2023 (13 pages) (6 pages of English Translation and 7 pages of Original Document).

(Continued)

*Primary Examiner* — Tracy C Chan
(74) *Attorney, Agent, or Firm* — Holland & Hart LLP

(57) ABSTRACT

Methods, systems, and devices for cache architectures for memory devices are described. For example, a memory device may include a main array having a first set of memory cells, a cache having a second set of memory cells, and a cache delay register configured to store an indication of cache addresses associated with recently performed access operations. In some examples, the cache delay register may be operated as a first-in-first-out (FIFO) register of cache addresses, where a cache address associated with a performed access operation may be added to the beginning of the FIFO register, and a cache address at the end of the FIFO register may be purged. Information associated with access operations on the main array may be maintained in the cache, and accessed directly (e.g., without another accessing of the main array), at least as long as the cache address is present in the cache delay register.

21 Claims, 9 Drawing Sheets

(56) References Cited

U.S. PATENT DOCUMENTS

| | | | |
|---|---|---|---|
| 2010/0235579 A1* | 9/2010 | Biles | G06F 12/127 |
| | | | 711/E12.001 |
| 2013/0282984 A1* | 10/2013 | Bi | G06F 12/0806 |
| | | | 711/126 |
| 2014/0164711 A1 | 6/2014 | Loh et al. | |
| 2015/0026410 A1 | 1/2015 | Nguyen et al. | |
| 2015/0169439 A1* | 6/2015 | Torrant | G06F 12/126 |
| | | | 711/103 |
| 2017/0277639 A1* | 9/2017 | Awad | G06F 12/1036 |

OTHER PUBLICATIONS

Hanxin, S., "cache coherence Analysis and Implementation", Journal of Longyan Teachers College, vol. 22, Issue. 03, Jun. 25, 2004, pp. 4.

* cited by examiner

CACHE ARCHITECTURES WITH ADDRESS DELAY REGISTERS FOR MEMORY DEVICES

CROSS REFERENCE

The present application for patent is a continuation of U.S. patent application Ser. No. 16/891,635 by Del Gatto, entitled "CACHE ARCHITECTURES FOR MEMORY DEVICES", filed Jun. 3, 2020, assigned to the assignee hereof, and is expressly incorporated by reference in its entirety herein.

BACKGROUND

The following relates generally to one or more memory systems and more specifically to cache architectures for memory devices.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile.

DETAILED DESCRIPTION

Figure 1:
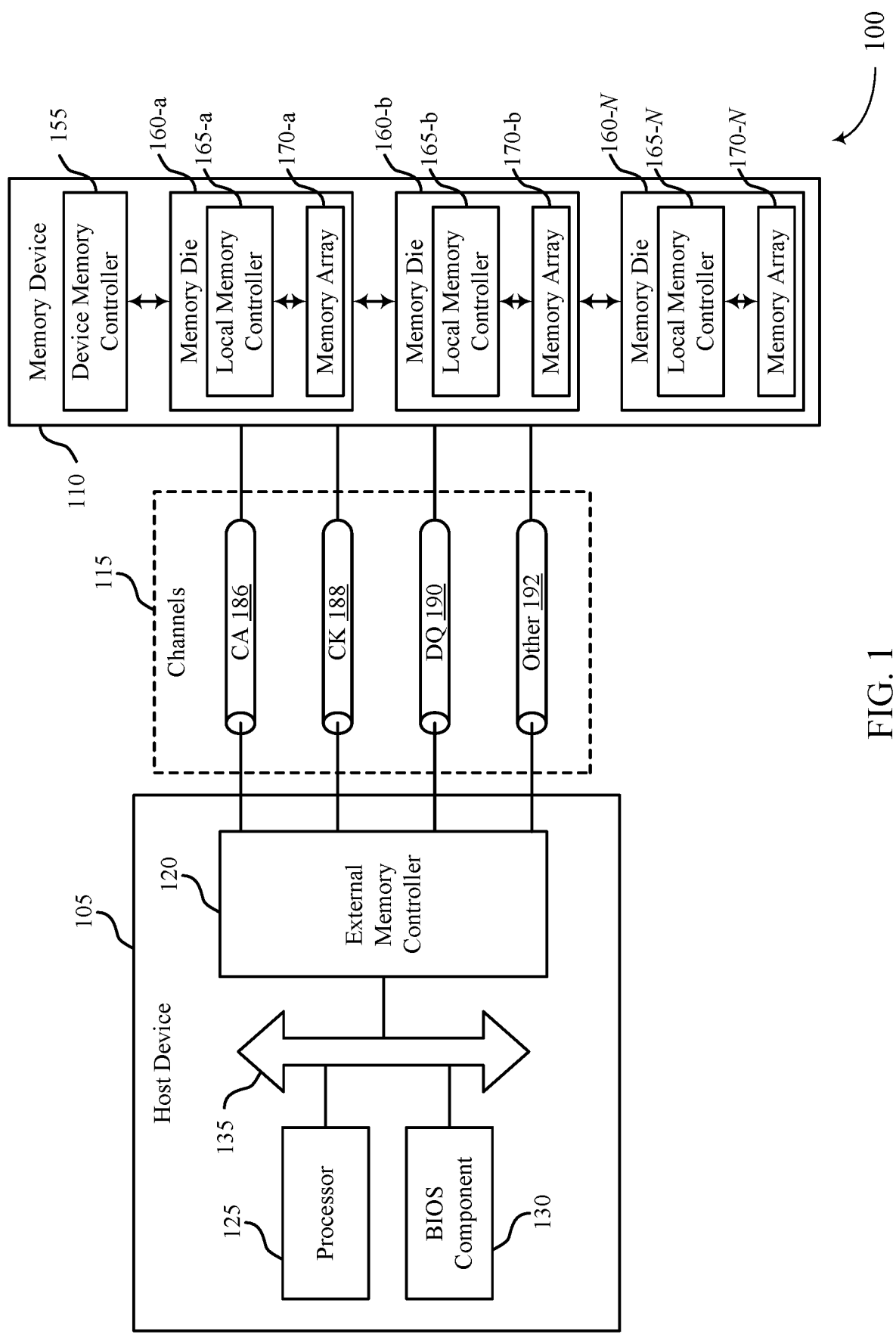
FIG. 1 illustrates an example of a system that supports cache architectures for memory devices in accordance with examples as disclosed herein.

In some memory architectures, it may be beneficial to provide a delay between access operations on the same memory cells of a memory array, such as a minimum read-after-write delay or other type of delay between access operations. For example, some memory cells or accompanying circuitry may accumulate heat, charge, or other some other characteristic or instability when accessed, and it may be beneficial to allow such a characteristic to dissipate or otherwise stabilize before performing another access operation on the same memory cells (e.g., at least some of the same memory cells). To support such a delay between successive access operations without incurring undue latency, information (e.g., data) associated with accessing a memory cell of a main array may be maintained in a memory cell of cache for some duration so that it can be accessed from the cache, which may be an alternative over performing another access operation on the same memory cell of the main array.

In accordance with examples as disclosed herein, a memory device may include a main array having a first set (e.g., one or more) of memory cells, a cache having a second set (e.g., one or more) of memory cells, and one or more cache delay registers configured to store an indication of one or more cache addresses associated with recently-performed access operations. A cache delay register may be operated in a manner that supports maintaining a threshold duration between successive operations on a same memory cell or a same address of the main array. For example, the cache delay register may be operated as a first-in-first-out (FIFO) register of cache addresses, where a cache address associated with a performed access operation (e.g., on a main array, associated with an address of the main array) may be added to the beginning of the FIFO register, and a cache address at the end of the FIFO register may be purged. Information associated with the access operation may be maintained in the cache, for example, at least as long as the cache address is present in the cache delay register and, upon receiving another access command, if associated information is available in the cache, the information may be retrieved from the cache rather than the main array. A threshold duration between successive access operations may be maintained by operating the cache delay register with a capacity that is related to a rate of access operations performed on the memory device. In some examples, providing such a cache delay register may support reduced power consumption, improved scalability, or both, or other benefits compared with other techniques for delaying operations on memory cells of a memory array.

Features of the disclosure are initially described in the context of memory systems, architectures, and associated techniques as described with reference to FIGS. 1-6. These and other features of the disclosure are further illustrated by and described with reference to an apparatus diagram and flowcharts that relate to cache architectures for memory devices as described with references to FIGS. 7-9.

FIG. 1 illustrates an example of a system 100 that supports cache architectures for memory devices in accordance with examples as disclosed herein. The system 100 may include a host device 105, a memory device 110, and a plurality of channels 115 coupling the host device 105 with the memory device 110. The system 100 may include one or more memory devices, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices 105. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

In some examples, a component, such as a memory device 110 (e.g., a device memory controller 155, a local memory controller 165), may be or may include a non-transitory computer-readable medium storing instructions (e.g., firmware) for performing techniques associated with cache architectures for memory devices in accordance with examples as disclosed herein. For example, such instructions, when executed by a component, such as a device memory controller 155 or a local memory controller 165, may cause the controller to perform techniques in accordance with the architectures and techniques described with reference to FIGS. 2 through 9.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

The memory device 110 may receive data or commands or both from the host device 105. For example, the memory device 110 may receive a write command indicating that the memory device 110 is to store data for the host device 105. In some examples, a local memory controller 165 may be operable to perform a write operation (e.g., a programming operation) on one or more memory cells of an associated memory array 170. During a write operation, a memory cell of the memory die 160 may be programmed to store a desired logic state. In some examples, a local memory controller 165 may identify a target memory cell on which to perform the write operation.

In some examples, the memory device 110 may receive a read command indicating that the memory device 110 is to provide stored data to the host device 105, and a local memory controller 165 may be operable to perform a read operation (e.g., a sense operation) on one or more memory cells of an associated memory array 170. During a read operation, the logic state stored in a memory cell of the memory array 170 may be determined. In some examples, a local memory controller 165 may identify a target memory cell on which to perform the read operation.

In some examples, one or more memory arrays 170 of a memory device 110 may include non-volatile memory cells for storing information (e.g., logic values, logic states). For example, a memory array 170 may include NAND (e.g., NAND flash) memory, read-only memory (ROM), phase change memory (PCM), self-selecting memory, 3-d cross-point (3DXP) memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM), among other types of non-volatile memory cells.

In a NAND memory architecture, each memory cell may include a transistor that has a floating gate or a dielectric material for storing an amount of charge representative of a logic value. The transistor may include a control gate and a floating gate, where the floating gate may be sandwiched between two portions of dielectric material. A logic value may be stored in the transistor by placing (e.g., writing, storing) a quantity of electrons (e.g., an amount of charge) on the floating gate. The amount of charge to be stored on the floating gate may depend on the logic value to be stored. The charge stored on the floating gate may affect the threshold voltage of transistor, thereby affecting the amount of current that flows through transistor when it is activated (e.g., when a voltage is applied to the control gate). A logic value stored in transistor may be sensed (e.g., as part of a read operation) by applying a voltage to the control gate to activate transistor, and measuring a resulting amount of current that flows through the transistor.

In some examples, a memory cell of a memory array 170 may store a logic state using a configurable material, which may be referred to as a memory element, a memory storage element, a material element, a material memory element, a material portion, or a polarity-written material portion, among others. A configurable material of a memory cell may refer to a chalcogenide-based storage component, such as a phase change memory (PCM) cell, a thresholding memory cell, or a self-selecting memory cell.

In a phase change architecture, memory cells may exhibit an observable difference between resistances of a crystalline state and an amorphous state in phase change materials, which may be chalcogenide materials. Writing the material in the crystalline state may result in a relatively low electrical resistance, and writing the material in an amorphous state may result in a relatively high electrical resistance. The difference in resistances of the material of the storage element depending on the logic state written to the material of the storage element may correspond to the read window of the storage element.

In a thresholding or self-selecting architecture, some or all of the set of logic states supported by the memory cells may be associated with an amorphous state of a chalcogenide material (e.g., the material in a single material state may be operable to store different logic states). In some examples, the storage element may be an example of a self-selecting memory cell, where the material used in the storage element may be operated so as to undergo a change to different physical state during normal operation of the memory cell. For example, a self-selecting memory cell may have a high threshold voltage state and a low threshold voltage state. The difference in threshold voltages of the material of the storage element may correspond to the read window of the storage element.

In an FeRAM architecture, a memory cell may store a state (e.g., a polarization state or dielectric charge) representative of the programmable states in a capacitor that includes a ferroelectric material to store a charge and/or a polarization representative of the programmable state. A ferroelectric material is characterized by an electric polarization where the material may maintain a non-zero electric charge in the absence of an electric field. A logic 0 or 1 may be written to the memory cell by controlling the electric polarization of the ferroelectric material, and thus the charge on the capacitor terminals, by applying a net voltage difference across the ferroelectric capacitor. To read, or sense, the stored state of a ferroelectric capacitor, a voltage may be applied across the ferroelectric capacitor and the charge stored by the ferroelectric capacitor may be detected. The degree of the change may depend on the initial polarization state, the applied voltages, intrinsic or other capacitance on access lines, and other factors.

In some memory architectures, it may be beneficial to ensure a delay between access operations on the same memory cells of a memory array 170. For example, some memory cells or accompanying circuitry may accumulate heat, charge, or other some other characteristic or instability when accessed. An accumulation of disturbances from accessing the same memory cells in relatively rapid succession may, for example, cause degradation of logic states stored by the accessed memory cells or neighboring memory cells, a degradation of a memory cell's ability to be written with a logic state, a degradation of a memory cell's ability to maintain a written logic state, a degradation or fatigue of a material or material interface of a memory cell, or a breakdown in isolation between components, among other degradation or otherwise adverse performance, or any combination thereof. Thus, after performing an access operation, it may be beneficial to allow various characteristics of memory cells or accompanying circuitry to stabilize or dissipate before performing another access operation on the same memory cells.

To support delays between successive access operations without incurring undue latency, information (e.g., data, logic states) associated with accessing a memory cell of a main array (e.g., of a memory array 170) may be maintained in a memory cell of cache for some duration so that it can be accessed (e.g., directly) from the cache, rather than performing another access operation on the same memory cell of the main array. In various examples, such a cache may be included in or otherwise associated with a device memory controller 155 or a local memory controller 165, and may include memory cells having a different architecture (e.g., cell architecture, storage architecture) than memory cells of a main array. For example, a main array (e.g., a memory array 170) may be configured with non-volatile memory cells, including one or more of the examples as described herein, and a cache may be configured with volatile memory cells or storage components, such as DRAM memory cells or other capacitive storage components. In some examples, the memory device 110 (e.g., a device memory controller 155, a local memory controller 165) may also include a cache delay register configured to store an indication of cache addresses associated with recently performed access operations, and the cache delay register may be operated in a manner that supports maintaining a threshold duration between successive operations on a same memory cell of the main array.

Figure 2:
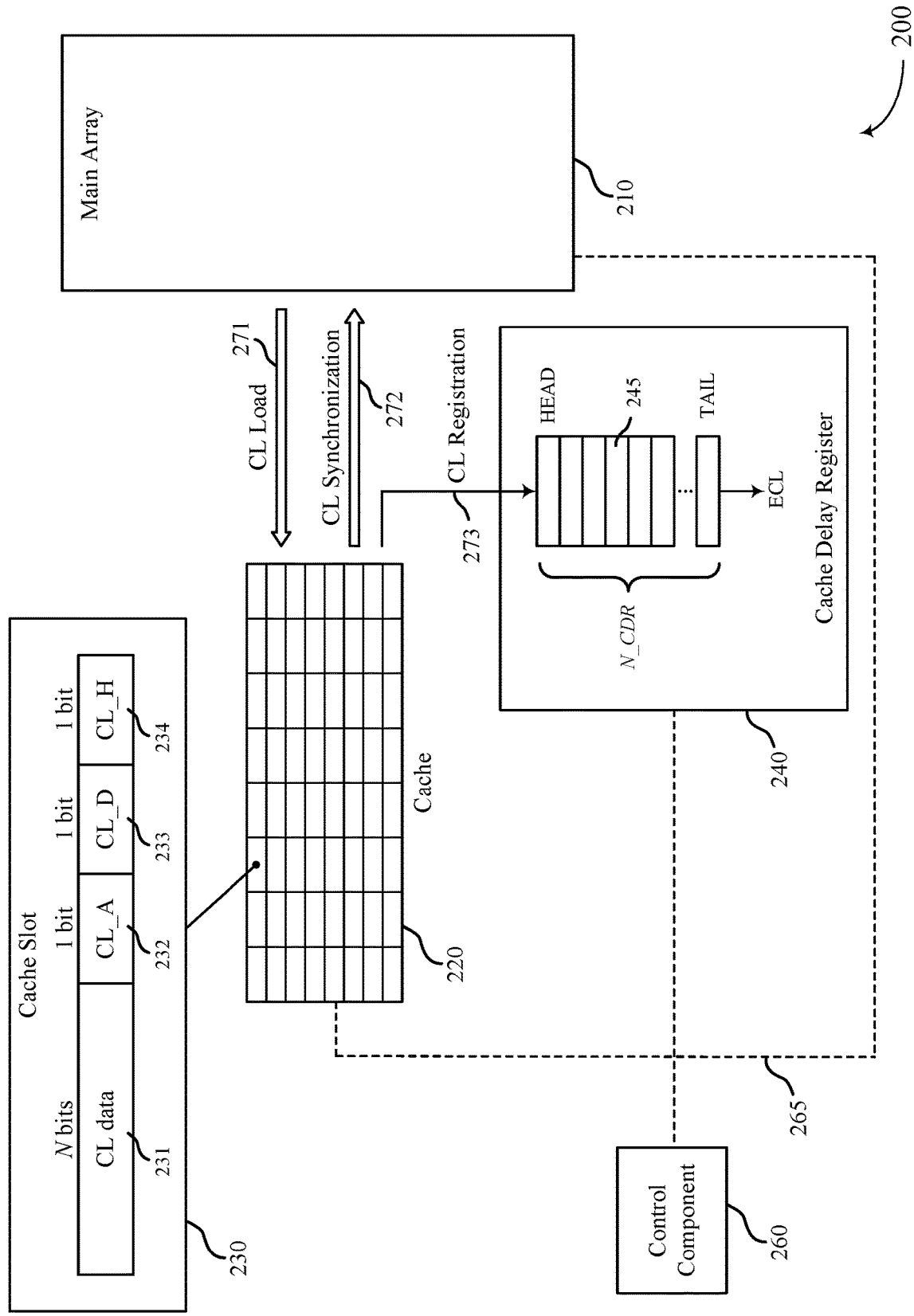
FIG. 2 illustrates an example of an architecture that supports cache architectures for memory devices in accordance with examples as disclosed herein.

FIG. 2 illustrates an example of an architecture 200 that supports cache architectures for memory devices in accordance with examples as disclosed herein. The architecture 200 may be included in or refer to components of a memory device 110 as described with reference to FIG. 1. The architecture 200 includes a main array 210, a cache 220, and a cache delay register 240. The architecture also includes a control component 260 which may be coupled with the main array 210, the cache 220, and the cache delay register 240 via one or more buses (e.g., a bus 265). The control component 260 may include circuitry, components (e.g., a processor, a non-transitory computer-readable medium), or various combinations thereof that are configured to perform one or more of the techniques described herein.

The main array 210 may include a first array of memory cells that are operable to store information (e.g., data) in the form of logic states. In some examples, memory cells of the main array 210 may be non-volatile memory cells or other types of emerging memory cells, such as NAND memory cells, phase change memory cells, thresholding memory cells, FeRAM memory cells, and others. The cache 220 may include a second array of memory cells, which may have a different architecture than memory cells of the main array 210. For example, memory cells of the cache 220 may be volatile memory cells, such as capacitive memory cells or DRAM memory cells. In some examples, memory cells of the cache 220 may support a relatively lower latency, a relatively shorter access duration, or a relatively faster access rate than the memory cells of the main array 210. In some examples, data stored in address of the cache 220 may be associated with an address of the main array 210 (e.g., according to a mapping or data synchronization between the cache 220 and the main array 210), which may be tracked with a logical-to-physical (L2P) pointer or other mapping (e.g., of or by the control component 260).

Data may be written to the main array 210 in response to a write command (e.g., from a host device 105, which may be received by or otherwise interpreted by the control component 260). In some examples, data associated with a write command may be written to the main array 210 directly (e.g., without first being written to the cache 220). In some examples, data associated with a write command may first be written to the cache 220 and may then be transferred to the main array (e.g., according to a cache line synchronization 272), or may be written to the cache 220 and the main array 210 in parallel (e.g., concurrently, simultaneously).

In some examples, data may be read from the main array 210 in response to a read command. Additionally or alternatively, data may be read from the cache 220 in response to a read command. For example, in response to a read command under some conditions, data may be transferred from the main array 210 to the cache 220 (e.g., according to a cache line load 271), and from the cache 220 to a host device 105 (e.g., via the control component 260). In response to a read command under some conditions, data that is already available in the cache 220 may be transferred (e.g., directly) to the host device 105 without accessing the main array 210.

In some examples, it may be beneficial to provide or impose a delay between successive access operations on the same memory cells (e.g., a same address) of the main array 210, such as a delay between a write operation and a subsequent read or write operation, or a delay between a read operation and a subsequent read or write operation, or both. To support such delays between successive access operations without incurring undue latency, information associated with accessing the main array 210 may be maintained in the cache 220 (e.g., by delaying eviction from the cache 220) for some duration so that it can be accessed from the cache 220 (e.g., directly), rather than performing another access operation on the same memory cells or address of the main array 210. For example, after a CL synchronization 272, associated information may be maintained in a cache slot 230 until a hold time expires, thereby supporting a delayed eviction from the cache 220.

In some examples, the cache 220 may include or be otherwise associated with a set of cache slots 230, each of which may include or be referred to as a cache line (CL). Each cache slot 230 may be associated with an address of the cache 220 (e.g., a CL address, a CL index, a CL_ID), and may be associated with a set of fields configured to support various operations of the cache 220. For example, a cache slot 230 may be associated with a first field 231 including the cached information (e.g., according to a set of N CL bits, where N may be any quantity or one bit or more than one bit). In some examples, a cache slot 230 may be associated with a second field 232 indicating whether the cache slot 230 is allocated to an address of the main array 210 (e.g., a "cache line allocated" flag, CL_A). For example, the second field 232 holding a logic 0 may indicate that the cache line (e.g., the first field 231, the cache slot 230) is empty or otherwise unallocated. In some examples, a cache slot 230 may be associated with a third field 233 indicating whether the cache slot 230 is synchronized with the main array 210 (e.g., a "cache line dirty" flag, CL_D). For example, the third field 233 holding a logic 1 may indicate that the cache line (e.g., the first field 231, the cache slot 230) is "dirty," which may indicate that the cache slot 230 needs to be synchronized with the main array 210 before being evicted. In some examples, a cache slot 230 may be associated with a fourth field 234 indicating whether the cache slot 230 is available for eviction (e.g., a "cache line hold" flag, CL_H). For example, the fourth field 234 holding a logic 1 may indicate that the cache line (e.g., the first field 231, the cache slot 230) is synchronized with the main array 210, but is to be maintained or otherwise not evicted.

In some examples, a cache slot 230 may include a counter to support providing or imposing a delay between successive access operations on the same memory cells of the main array 210. For example, when a cache slot 230 is used to support information transfer to or from the main array 210, such a counter may be used to track a duration since information was written to or read from the main array 210. However, such an approach may be accompanied by power consumption related to incrementing a counter at each of the cache slots 230, and including such a counter at each of the cache slots 230 may be associated with scaling limitations to support various sizes of a cache 220.

In the architecture 200, the cache delay register 240 may be operated in a manner that supports maintaining a threshold duration between successive operations on a same memory cell or memory address of the main array 210. For example, the cache delay register 240 may include a plurality of entries 245 that are operated as a first-in-first-out (FIFO) register of cache addresses, where a cache address associated with a performed access operation on the main array 210 (e.g., including a CL load 271 or a CL synchronization 272) is added to the beginning of the FIFO register (e.g., according to a CL registration 273), and a cache address at the end of the FIFO register is purged (e.g., associated with an evicted or evictable cache line, an empty cache line (ECL)). Although illustrated in the context of a FIFO register storing cache addresses that are moved from a beginning to an end, similar functionality, such as FIFO functionality, may be supported by various other techniques, such as storing cache addresses statically in a given slot or position of the cache delay register 240 and tracking which slots of the cache delay register 240 refers to a most-recently or least-recently added cache address (e.g., for adding a new cache address to the cache delay register 240 in a manner that replaces a least-recently added cache address). The cache delay register 240 may replace the use of respective counters for each of the cache slots 230, which may support more efficient use of cache area, or decreased power consumption, among other benefits.

Information associated with an access of the main array 210 may be maintained in the cache 220 for a duration, such as at least as long as the associated cache address is present in the cache delay register 240, which may include maintaining a cache line hold value (e.g., of a fourth field 234) or otherwise delaying eviction of the cache slot 230 at least as long as the cache address is present in the cache delay register 240. Upon a successive access command (e.g., a read or write command received by the control component 260), if associated information is available in the cache 220 (e.g., as indicated by cache line allocated indicator, as indicated by a cache line hold indicator, as indicated by a mapping between an address of the main array 210 and an address of the cache 220), the information may be retrieved from the cache 220 without accessing the main array 210, thereby preventing or mitigating access disturbance to the memory cells or associated circuitry that are to be held or stabilized.

A threshold duration between successive access operations may be maintained by operating the cache delay register 240 with a capacity, N_CDR, that is related to a rate of access operations supported by the architecture 200. For example, the capacity may be defined by:

$$N\_CDR=(\text{Hold Time})/(\text{Min Request Time})$$

where Hold Time may refer to a configured delay (e.g., a minimum delay) between successive access operations on the same memory cells or addresses, and Min Request Time may refer to a duration between receiving access commands by the control component 260, a minimum time between successive accesses of the cache 220, a clock rate associated with operations of the architecture 200, or some other operational timing. In some examples, N_CDR may refer to a total manufactured capacity of the cache delay register 240 defined based on a known Hold Time and Min Request Time. In some examples, N_CDR may be variable, and may refer to all or a subset of a manufactured capacity of the cache delay register 240. For example, N_CDR may be selected or configured based on a desired hold time, which may be based on an operating condition or mode of a memory device (e.g., according to a variable Hold Time), or may be selected or configured based on a variable time between access operations, such as a variable clock time or access frequency (e.g., according to a variable Min Request Time).

In some examples, the architecture 200 may support the selection of a victim cache line (e.g., a cache line to be evicted, emptied, or replaced with different information). For example, to support an eviction of a cache slot 230, the control component 260 may be configured to select or identify one or more allocated cache slots 230 that are available for eviction, which may include one or more cache slots 230 having a value of CL_A=1 and a value of CL_H=0. In some examples, the control component 260 may be configured to return an index or address of the cache slot 230 that meets such a requirement, which may be referred to as a victim CL_ID or VCL_ID.

In some examples, a victim cache slot 230 may be included or added to the cache delay register 240. For example, an address of a victim cache slot 230 (e.g., a VCL_ID) may be received as an input parameter, and the control component 260 may determine whether or not the cache slot 230 is dirty (e.g., whether the cache slot is associated with a value of CL_D=1, whether the cache line needs to be synchronized with the main array 210 before eviction). If the cache slot 230 is dirty, the information of the cache slot 230 (e.g., of a first field 231) may be synchronized on the main array 210 (e.g., according to a CL synchronization 272), and if not, a CL synchronization 272 may be omitted. The control component 260 may add the VCL_ID to the cache delay register 240, which may delay accessing an address of the main array 210 associated with the newly-added information in the victim cache slot 230.

In some examples, the control component 260 may be configured to perform a cache delay registry check. For example, the control component 260 may determine whether the cache delay register 240 is full, and if so, the control component 260 may purge or remove an index of an evicted cache slot 230 from the cache delay register 240. In some examples, following a purge of an evicted cache slot 230 from the cache delay register 240, the evicted cache slot 230 may have a hold flag reset (e.g., setting CL_H=0) and an allocation flag reset (e.g., setting CL_A=0).

In some examples, the control component 260 may be configured to remove an address of a cache slot 230 (e.g., a CL_ID) from the cache delay register 240. For example, when information is accessed from the cache 220, rather than by accessing the main array 210, the control component 260 may remove a CL_ID from the cache delay register 240 and shift the remaining entries towards the head of the cache delay register 240 (e.g., a FIFO head).

Although the architecture 200 is illustrated with a single cache delay register 240, an architecture in accordance with examples as disclosed herein may include any quantity of one or more cache delay registers 240. In some examples, different cache delay registers 240 may be associated with different types of access operations. For example, to support a target or threshold delay between write operations on the main array 210 or, more generally, a threshold delay between a write operation and a successive access operation (e.g., read or write), a first cache delay register 240 may be associated with tracking addresses of cache slots 230 associated with a write operation on the main array 210. Additionally or alternatively, to support a target or threshold delay between read operations on the main array 210 or, more generally, a threshold delay between a read operation and a successive access operation (e.g., read or write), a second cache delay register 240 may be associated with tracking addresses of cache slots 230 associated with a read operation on the main array 210. In some examples, different cache delay registers 240 may be used for tracking or maintaining read-after-write delays, read-after-read delays, write-after-read delays, write-after-write delays, among other delays between various types of access operations.

In some examples, upon performing a CL Load 271, an address of an associated cache slot 230 (e.g., a CL IDX) may be stored in a cache read registry (CRR), which may be an example of a cache delay register 240. In some examples, a synchronization process (e.g., a CL synchronization 272) may select from any cache slot 230 that is not placed in a CRR and, where applicable, another a cache delay register 240 (e.g., a cache delay register 240 associated with synchronization delays). To support such techniques, a cache slot 230 may also include a fifth field (not shown) to track the presence of a cache line address or index in the CRR (e.g., a CL_R flag).

The components of the architecture 200 may correspond to various components of a memory device 110. For example, a main array 210 may refer to one of the memory arrays 170 of a memory device 110, or some plurality of memory arrays 170 of a memory device 110 (e.g., a subset or all of the memory arrays 170). In some examples, each of the memory dies 160 of a memory device 110 may include its own cache 220, and in other examples, a cache 220 may be shared among a plurality of memory dies 160. In some examples, each of the memory dies 160 of a memory device 110 may include its own cache delay register 240, and in other examples, one or more cache delay registers 240 may be located outside the memory dies 160 or a memory device, such as being a component of or otherwise associated with a device memory controller 155. In various examples, operations described with reference to the control component 260 may be performed by one or more local memory controllers 165 of a memory device 110, or by a device memory controller 155 of a memory device 110, or distributed between a device memory controller 155 and one or more local memory controllers 165.

In some examples, operations supported by the architecture 200 may be performed (e.g., by the control component 260) based on a relationship between a quantity of empty or available cache slots 230 of the cache 220 and a capacity of the cache delay register 240. For example, operations may consider an "almost full" condition of the cache 220, which may true when a quantity of empty or unallocated cache slots 230 of a cache 220 is less than or equal to (N_CDR+1). Various operations may be performed based on whether the cache 220 is full, almost full, or not full (e.g., empty, not "almost full"). Moreover, various operations of the architecture 200 may be performed based on whether information associated with an access command (e.g., as received by the control component 260) is or is not available in the cache 220, which may be referred to as a "cache hit" or a "cache miss," respectively.

In some examples, the control component 260 may be configured to operate the architecture 200 with a cache hit under a "not almost full" condition. In such examples, the control component 260 may receive an access request (e.g., a read request, from a host device 105), which may be associated with an address of a cache slot 230. For example, the control component 260 may include a mapping of information between the main array 210 and the cache 220 and, based at least in part on receiving an access request, the control component 260 may identify a cache slot 230 that includes the requested information. In various examples, a read or write request may cause the control component 260 to generate a cache line read (e.g., reading from the associated cache slot 230 to provide information to the requesting host device 105, reading from the associated cache slot 230 to write information to the main array 210) without accessing the main array 210 (e.g., due to the "cache hit" condition). In some examples, a latency or duration for performing such operations may be referred to as a "hit duration" or "hit penalty."

In some examples, the control component 260 may be configured to operate the architecture 200 with a cache miss under a "not almost full" condition. In such examples, the control component 260 may receive an access request (e.g., a read request, from a host device 105), which may not be associated with an address of a cache slot 230. For example, the control component 260 may include a mapping of information between the main array 210 and the cache 220 and, based at least in part on receiving an access request, the control component 260 may identify that no cache slot 230 includes the requested information. In various examples, a CL read or write request may cause the control component 260 to perform a CL load 271 (e.g., to an empty or unallocated cache slot 230), or otherwise read directly from the main array 210. In some examples, a latency or duration for performing such operations may be referred to as a "miss duration" or "miss penalty," which may be longer in duration than a hit duration or hit penalty.

Figure 3:
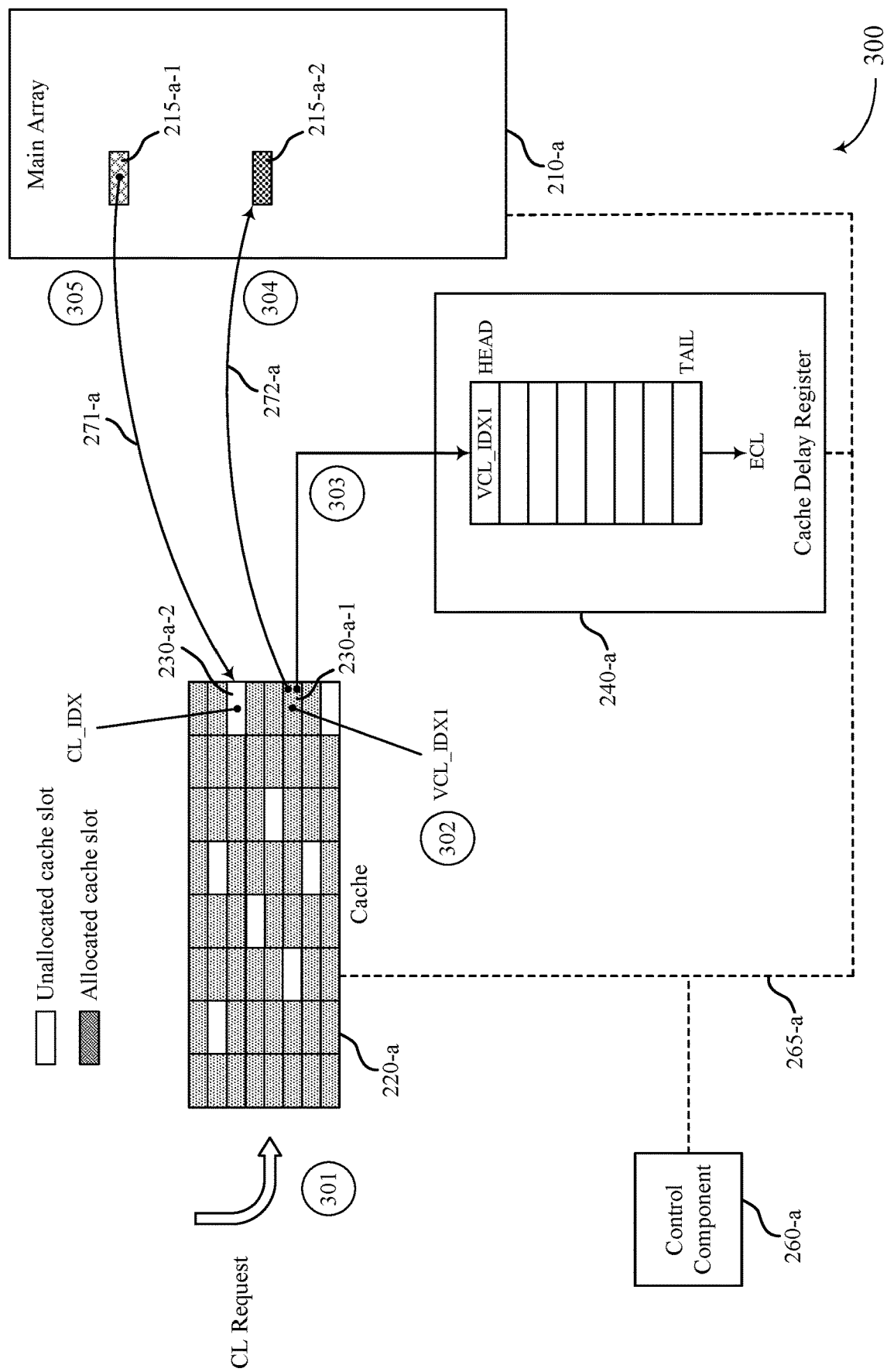
FIG. 3 through 5 illustrate examples of operating architectures that supports cache architectures for memory devices in accordance with examples as disclosed herein.

FIG. 3 illustrates an example of operating an architecture 300 that supports cache architectures for memory devices in accordance with examples as disclosed herein. The architecture 300 includes a main array 210-*a*, a cache 220-*a*, a cache delay register 240-*a*, a control component 260-*a*, and a bus 265-*a*, each of which may be an example of the respective component described with reference to the architecture 200 of FIG. 2. In the example of FIG. 3, the control component 260-*a* may be configured to operate the architecture 300 with a cache miss under an "almost full" condition, which may include one or more of operations of 301 through 305.

In some examples, the operations of 301 may include the control component 260-*a* receiving an access request (e.g., a read request from a host device 105, a CL read or write request). The received request may include or otherwise refer to an address 215-*a*-1 of one or more memory cells of the main array 210-*a*. The control component 260-*a* may identify that information associated with the received request does not exist in the cache 220-*a*, and may identify that the cache 220-*a* is operating in the almost full condition (e.g., identifying a condition where a quantity of empty cache slots 230 of the cache 220-*a* is less than or equal to (N_CDR+1)).

In some examples, the operations of 302 may include the control component 260-*a* selecting a "Not Empty" cache slot 230 as a victim CL (e.g., a VCL) for eviction. For example, the control component 260-*a* may identify a cache slot 230-*a*-1 having a cache line allocated value of CL_A=1 and a cache line hold value of CL_H=0, where the cache slot 230-*a*-1 may be associated with an address 215-*a*-2 of the main array 210-*a* (e.g., by an address mapping resource of the control component 260-*a*).

In some examples, the operations of 303 may include the control component 260-*a* transferring an index of the cache slot 230-*a*-1 (e.g., VCL_IDX1) to the cache delay register 240-*a*. For example, if a CL synchronization 272-*a* is performed between the cache slot 230-*a*-1 and the address 215-*a*-2 of the main array 210-*a*, transferring the index of the cache slot 230-*a*-1 to the cache delay register 240-*a* may delay or inhibit a subsequent access operation on the address 215-*a*-2 (e.g., after the write to the address 215-*a*-2 associated with the CL synchronization 272-*a*). In some examples (e.g., if a CL synchronization 272-*a* is not performed), the operations of 303 may be omitted.

In some examples (e.g., if the cache slot 230-*a*-1 is dirty, such as being associated with a cache line dirty value of CL_D=1), the operations of 304 may include the control component 260-*a* performing a synchronization (e.g., a CL synchronization 272-*a*) between the cache slot 230-*a*-1 and the main array 210-*a* (e.g., the address 215-*a*-2 of one or more memory cells of the main array 210-*a*). In some examples (e.g., if the cache slot 230-*a*-1 associated with VCL_IDX1 is not dirty, such as being associated with a cache line dirty value of CL_D=0), the operations of 304 may be omitted.

In some examples, the operations of 305 may include the control component 260-*a* loading data, associated with the request of 301, from the main array 210-*a*. The operations of 305 may be associated with a CL load 271-*a*, which may include loading the information from the address 215-*a*-1 of the main array 210-*a* into a cache slot 230-*a*-2 associated with an address or index of CL IDX. The control component 260-*a* may identify the cache slot 230-*a*-2 based at least in part on the cache slot 230-*a*-2 being empty or unallocated (e.g., having a cache slot allocated value of CL_A=0). In various examples, the requested data (e.g., from the address 215-*a*-1) may be provided to the requestor from the cache slot 230-*a*-2 (e.g., after the CL load 271-*a*), or directly from the main array 210-*a* (e.g., before, after, concurrently with, or in parallel with the CL load 271-*a*). In some examples, the architecture 300 may include a cache read register (not shown), and an index of the cache slot 230-*a*-2 may be transferred to the cache read register to delay or inhibit a subsequent access operation on the address 215-*a*-1 (e.g., after the read of the address 215-*a*-1 associated with the CL load 271-*a*).

Figure 4:
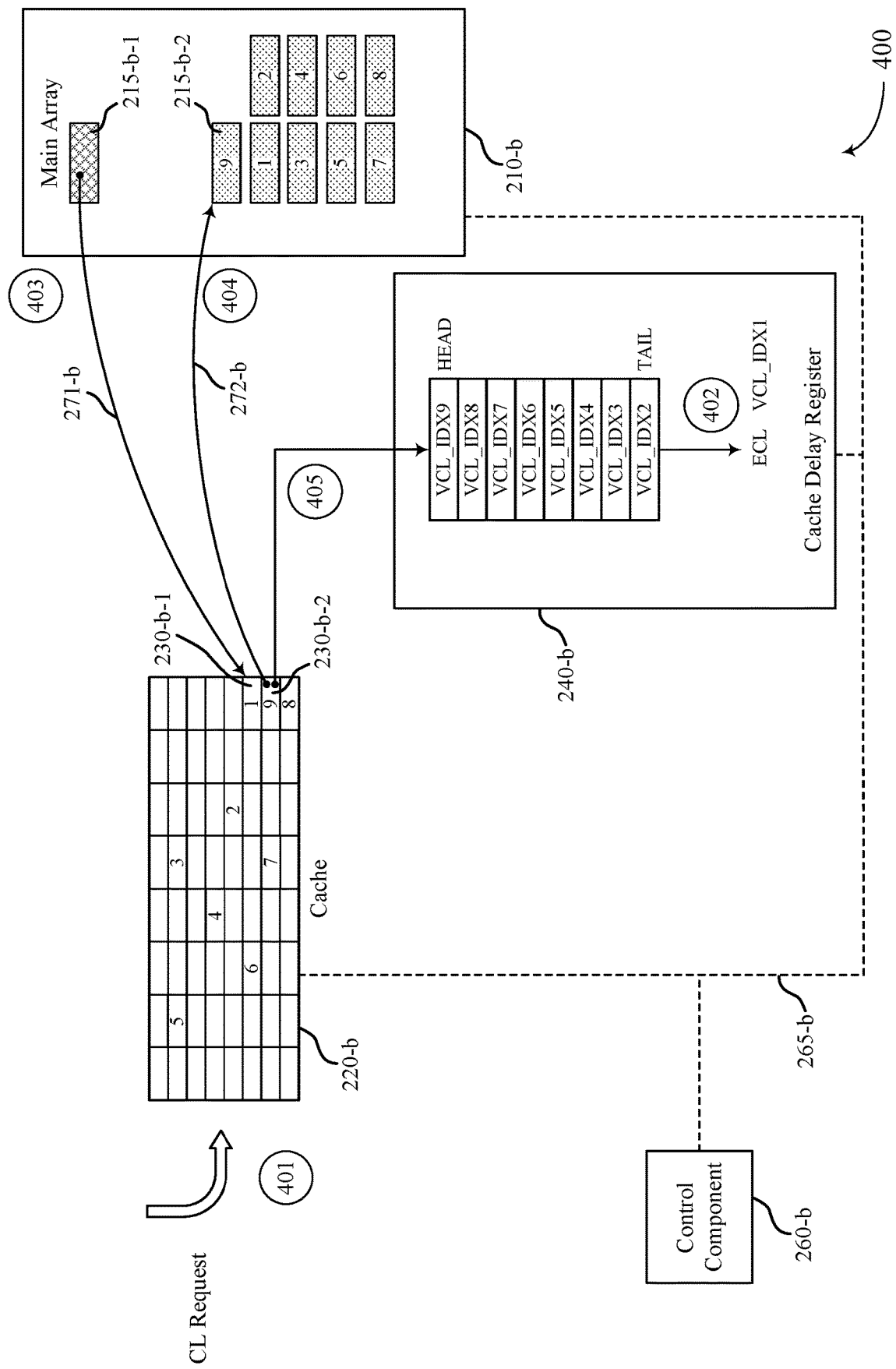

FIG. 4 illustrates an example of operating an architecture 400 that supports cache architectures for memory devices in accordance with examples as disclosed herein. The architecture 400 includes a main array 210-*b*, a cache 220-*b*, a cache delay register 240-*b*, a control component 260-*b*, and a bus 265-*b*, each of which may be an example of the respective component described with reference to the architecture 200 of FIG. 2. In the example of FIG. 4, the control component 260-*b* may be configured to operate the architecture 400 with a cache miss under a "full" condition, which may include one or more of the operations of 401 through 405.

In some examples, the operations of 401 may include the control component 260-*b* receiving an access request (e.g., a read request from a host device 105, a CL read or write request). The received request may include or otherwise refer to an address 215-*b*-1 of one or more memory cells of the main array 210-*b*. The control component 260-*b* may identify that information associated with the received request does not exist in the cache 220-*b*, and may identify that the cache 220-*b* is operating in the full condition (e.g., identifying a condition where there are no empty cache slots 230 of the cache 220-*b*).

In some examples, the operations of 402 may include the control component 260-*b* purging a cache slot index from the cache delay register 240-*b* (e.g., because the cache delay register 240-*b* is full, containing indexes or addresses for cache slots 230 numbered 1 through 8). For example, VCL_IDX1 may refer to cache slot 230-*b*-1, which may be a cache slot 230 that is already synchronized with the main array 210-*b* for at least a threshold duration (e.g., at least a Hold Time before). Thus, the cache slot 230-*b*-1 identified by VCL_IDX1 may be evicted from the cache 220-*b* or otherwise made available, and the cache slot 230-*b*-1 may be reused to accommodate the request of 401. In other words, in response to the access request of 401, the control component 260-*b* may identify or return VCL_IDX1.

In some examples, the operations of 403 may include the control component 260-*b* loading data, associated with the request of 401, from the main array 210-*b*. The operations of 403 may be associated with a CL load 271-*b*, which may include loading the information from the address 215-*b*-1 of the main array 210-*b* into the evicted cache slot 230-*b*-1. In various examples, the requested data (e.g., from the address 215-*b*-1) may be provided to the requestor from the cache slot 230-*b*-1 (e.g., after the CL load 271-*b*), or directly from the main array 210-*b* (e.g., before, after, concurrently with, or in parallel with the CL load 271-*b*). In some examples, the architecture 400 may include a cache read register (not shown), and an index of the cache slot 230-*b*-1 may be transferred to the cache read register to delay or inhibit a subsequent access operation on the address 215-*b*-1 (e.g., after the read of the address 215-*b*-1 associated with the CL load 271-*b*).

In some examples (e.g., to make a cache slot 230 available in the cache 220-b), the operations of 404 may include the control component 260-b performing a synchronization (e.g., a CL synchronization 272-b) between a cache slot 230-b-2 and the main array 210-b (e.g., an address 215-b-2 of one or more memory cells of the main array 210-b).

In some examples, the operations of 405 may include the control component 260-b transferring an index of the cache slot 230-b-2 (e.g., VCL_IDX9) to the cache delay register 240-b. Transferring the index of the cache slot 230-b-2 to the cache delay register 240-b may delay or inhibit a subsequent access operation on the address 215-b-2 (e.g., after the write to the address 215-b-2 associated with the CL synchronization 272-b).

Figure 5:
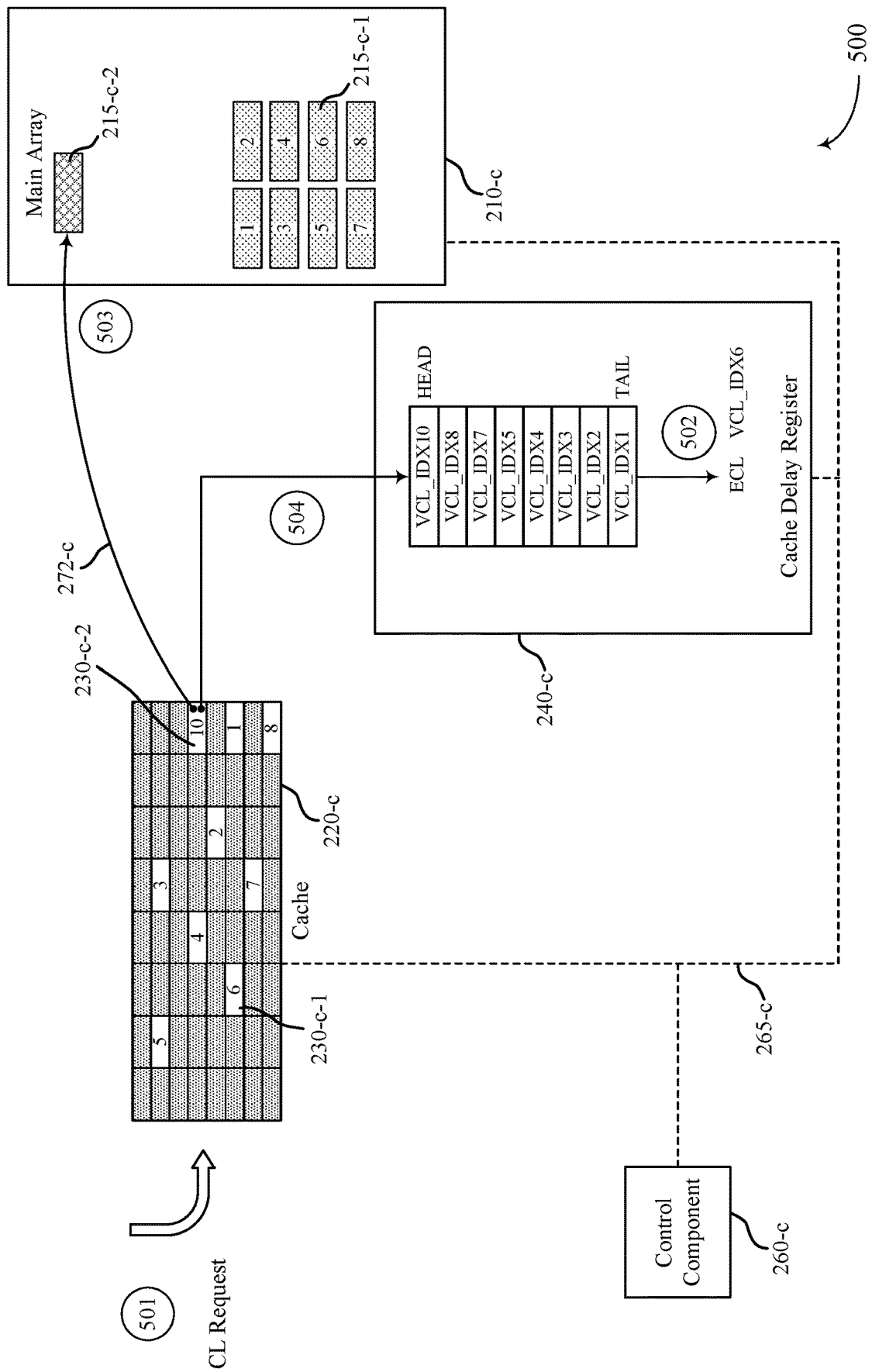

FIG. 5 illustrates an example of operating an architecture 500 that supports cache architectures for memory devices in accordance with examples as disclosed herein. The architecture 500 includes a main array 210-c, a cache 220-c, a cache delay register 240-c, a control component 260-c, and a bus 265-c, each of which may be an example of the respective component described with reference to the architecture 200 of FIG. 2. In the example of FIG. 5, the control component 260-c may be configured to operate the architecture 500 with a cache hit under a "full" or "almost full" condition, which may include one or more of the operations 501 through 504.

In some examples, the operations of 501 may include the control component 260-c receiving an access request (e.g., a read request from a host device 105, a CL read or write request). The received request may include or otherwise refer to an address 215-c-1 of one or more memory cells of the main array 210-c. The control component 260-c may identify that information associated with the received request exists in the cache 220-c (e.g., at cache slot 230-c-1, based on an address mapping resource of the control component 260-c), and may identify that the cache 220-c is operating in the full or almost full condition (e.g., identifying a condition where there are no empty cache slots 230 of the cache 220-c, identifying a condition where a quantity of empty cache slots 230 of the cache 220-c is less than or equal to (N_CDR+1)). The requested data (e.g., associated with the address 215-c-1 and the cache slot 230-c-1) may be provided to the requestor from the cache slot 230-c-1.

In some examples, the operations of 502 may include the control component 260-c purging a cache slot index from the cache delay register 240-c (e.g., because the cache delay register 240-c is full, containing indexes or addresses for cache slots 230 numbered 1 through 8). In some examples, the control component 260-c may purge an oldest address or index of the cache delay register 240-c (e.g., purging VCL_IDX1). However, in some examples, based at least in part on the "hit" condition identified in the operations of 501, the control component 260-c may purge the index of the cache slot 230-c-1 associated with the hit (e.g., VCL_IDX6).

In other words, a Hold Time may be stopped if a cache slot 230 is accessed before an associated time expiration. For example, the control component 260-c may identify that the cache slot 230-c-1 is indicated or included in the cache delay register 240-c (e.g., based at least in part on the cache slot 230-c-1 having a cache line hold value CL_H=1), which may be accompanied by the control component 260-c performing a search (e.g., from HEAD to TAIL) on the cache delay register 240-c for the index associated with the cache slot 230-c-1. In some examples, purging the index of the cache slot 230-c-1 (e.g., from a middle position of the cache delay register 240-c) may be accompanied by shifting other indexes (e.g., VCL_IDX1 through VCL_IDX5) up by one position in the cache delay register 240-c.

In some examples (e.g., to make a cache slot 230 available in the cache 220-c), the operations of 503 may include the control component 260-c performing a synchronization (e.g., a CL synchronization 272-c) between a cache slot 230-c-2 and the main array 210-c (e.g., an address 215-c-2 of one or more memory cells of the main array 210-c).

In some examples, the operations of 504 may include the control component 260-c transferring an index of the cache slot 230-c-2 (e.g., VCL_IDX10) to the cache delay register 240-c. Transferring the index of the cache slot 230-c-2 to the cache delay register 240-c may delay or inhibit a subsequent access operation on the address 215-c-2 (e.g., after the write to the address 215-c-2 associated with the CL synchronization 272-c).

Figure 6:
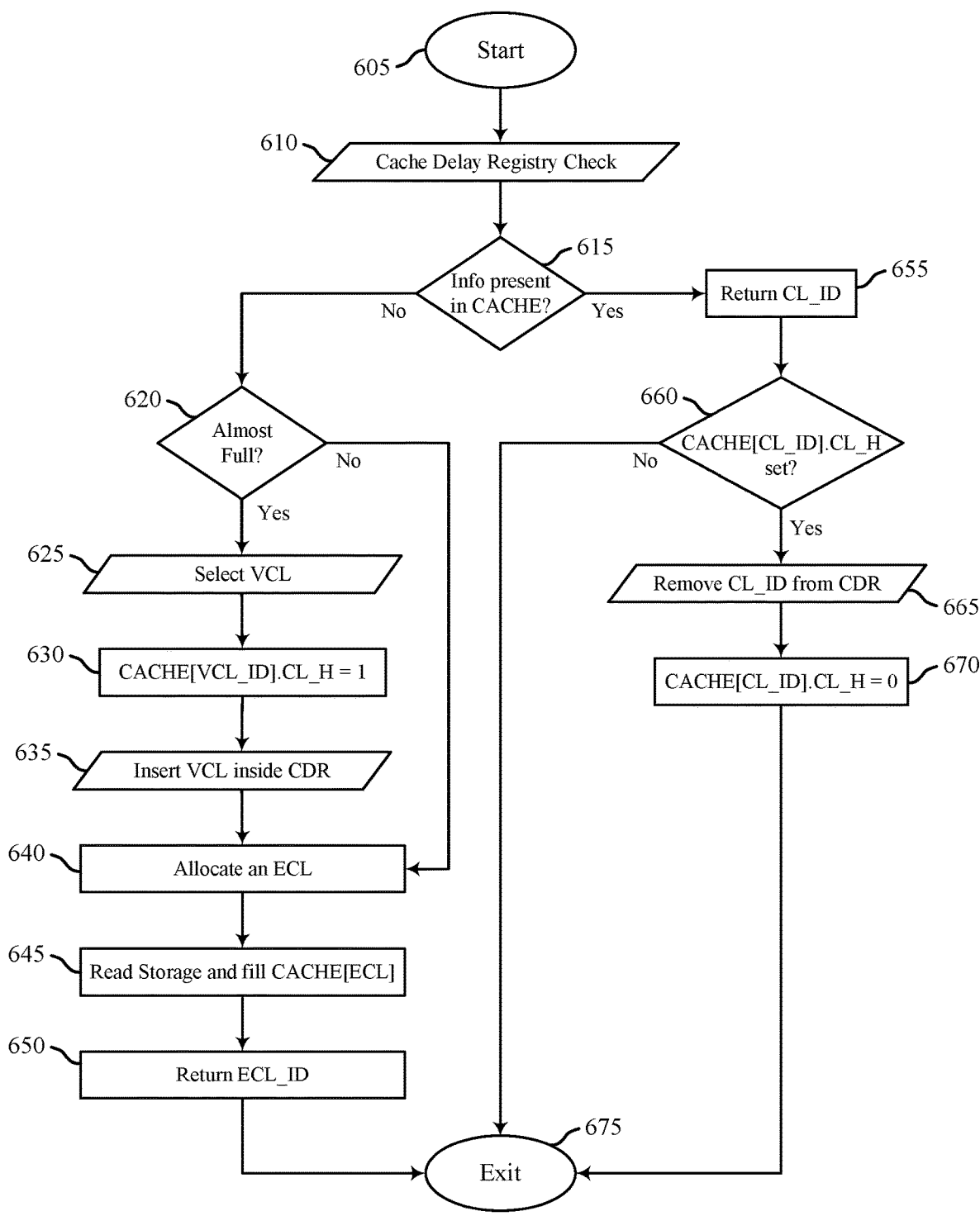
FIG. 6 illustrates an example of a process flow that supports cache architectures for memory devices in accordance with examples as disclosed herein.

FIG. 6 illustrates an example of a process flow 600 that supports cache architectures for memory devices in accordance with examples as disclosed herein. The process flow may be performed by a memory device 100, such as a process flow that includes a control component 260 described with reference to FIGS. 2 through 5.

At 605, the process flow 600 may start. In various examples, the operations of 605 may be initiated or otherwise based at least in part on an access command (e.g., received at the control component 260, received from a host device 105). In some examples, the access command may include a memory address, such as an address of a main array 210, an address of a cache 220, or some other indication of the information targeted by the access command.

At 610, the process flow 600 may include performing a cache delay registry check. For example, at 610, the control component 260 may determine whether an address of the cache 220 associated with the access command is included in a cache delay registry 240, or otherwise determine whether information targeted by the access command is associated with an address of the main array 210 that is not to be accessed directly (e.g., according to a cache line hold flag, CL_H).

At 615, the process flow 600 may include determining whether information associated with the access command is available in the cache 220. For example, the control component 260 may determine whether a cache line address included in the access command is included in the cache, or that a cache line address otherwise associated with the access command (e.g., an address of the main array 210) is mapped to the cache 220. If so, the process flow 600 may proceed to 655 and, if not, the process flow 600 may proceed to 620.

At 620, the process flow 600 may include evaluating the cache 220 relative to an almost full condition. For example, the control component 260 may determine whether a quantity of empty cache slots 230 of the cache 220 is less than or equal to (N_CDR+1). If so, the process flow may proceed to 625 and, if not, the process flow may proceed to 640.

At 625, the process flow 600 may include selecting a victim cache line (e.g., a cache slot 230 that is eligible for eviction). For example, the control component 625 may select a cache slot 230 having a cache line allocated value of CL_A=1 and a cache line hold value of CL_H=0.

At 630, having selected a victim cache line, the process flow 600 may include setting the cache line hold value for the selected cache slot 230 to CL_H=0 (e.g., in advance of writing new information to the selected cache slot 230). At 635, the process flow may include inserting an address of index of the selected victim cache line into the cache delay register 240 (e.g., to delay subsequent access operations after the main array 210 is accessed in response to the access command associated with starting the process flow 600).

At 640, the process flow 640 may include allocating an evicted cache line. For example, whether an associated cache slot 230 was empty, or selected as a victim cache line, the control component 625 may allocate the cache slot 230 to hold information associated with the access command. At 645, the process flow 600 may include reading storage (e.g., a main array 210) and filling the evicted cache line with the read information. At 650, the process flow 600 may include returning the address or index of the evicted cache line, and the process flow 600 may proceed to completion at 675.

At 655, in the event that information associated with the access command is present in the cache, the process flow may include returning the associated cache line address or index (e.g., CL_ID).

At 660, the process flow 600 may include an evaluation of whether the associated cache line address is present in the cache delay register 240 (e.g., if a cache line hold flag is set to CL_H=0 or CL_H=1). If so, the process flow 600 may proceed to 665 and, if not, the process flow 600 may proceed to completion at 675.

At 665, when the associated cache line that includes the information of the access command is also identified in the cache delay register 240, the indication (e.g., CL_ID) may be removed from the cache delay register 240. At 670, the cache line hold flag for the associated cache line may be set to CL_H=0, and the process flow may proceed to completion at 675.

Figure 7:
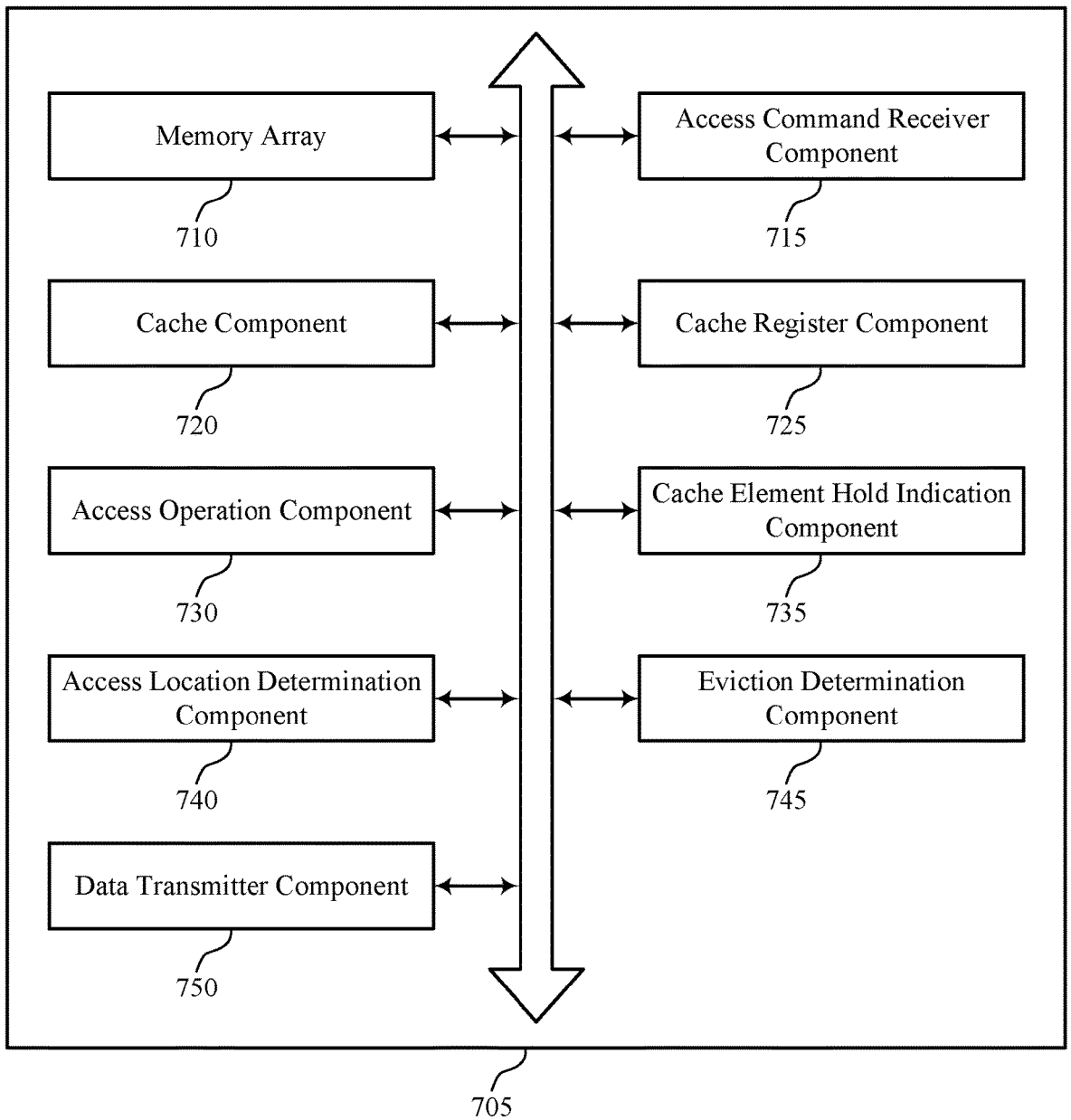
FIG. 7 shows a block diagram of a memory device that supports cache architectures for memory devices in accordance with aspects of the present disclosure.

FIG. 7 shows a block diagram 700 of a memory device 705 that supports cache architectures for memory devices in accordance with examples as disclosed herein. The memory device 705 may be an example of aspects of a memory device as described with reference to FIGS. 1 through 6. The memory device 705 may include a memory array 710, an access command receiver component 715, a cache component 720, a cache register component 725, an access operation component 730, a cache element hold indication component 735, an access location determination component 740, an eviction determination component 745, and a data transmitter component 750. Each of these modules may communicate, directly or indirectly, with one another (e.g., via one or more buses).

The access command receiver component 715 may be configured to receive access commands. In some examples, the access command receiver component 715 may receive a command to write information to the memory device. In some examples, the access command receiver component 715 may receive a command to read information from the memory device.

The cache component 720 may be configured to write information to an address of a cache based on the access command receiver component 715 receiving a command. In some examples, the cache component 720 may be configured to write information from the memory array 710 to an address of the cache based on the access command receiver component 715 receiving a command. In some examples, the cache component 720 may be configured to write information to the cache based on an address of the cache being identified for eviction. In some examples, the cache component 720 may be configured to support writing, based on identifying an address of the cache for the eviction, information from the address to the memory array 710.

In some examples, the cache register component 725 may store, based on writing information to the cache, an indication of an address of the cache in a FIFO register, or an otherwise configured register of cache addresses. In some examples, the cache register component 725 may store, based on writing information from the memory array 710 to the cache, an indication of an address of the cache in a FIFO register, or an otherwise configured register of cache addresses. In some examples, the cache register component 725 may store, based on writing information to the memory array 710, an indication of an address of the cache in a FIFO register, or an otherwise configured register of cache addresses.

In some examples, the cache register component 725 may store, based on writing information from the memory array 710 to an address of the cache, an indication of the address of the cache in a second FIFO register, or an otherwise configured register of cache addresses.

In some examples, the cache register component 725 may remove an indication of an address from the register based on the access command receiver component 715 receiving a command (e.g., to write information, to read information). In some examples, the cache register component 725 may remove an indication of an address from the register based on a determination to access information from the cache.

The access operation component 730 may perform operations based on stored indications of cache addresses in a register of the cache register component 725. In some examples, the access operation component 730 may write information to the memory array 710 based on a command received by the access command receiver component 715. In some examples, the access operation component 730 may be configured to write information from the memory array 710 to the cache component 720. In some examples, the access operation component 730 may be configured to write information from the cache component 720 to the memory array 710.

The cache element hold indication component 735 may store (e.g., based on writing information to the cache, based on writing information from the memory array 710 to an address of the cache) an indication that information stored at an address of the cache is to be maintained in the cache. In some examples, the cache element hold indication component 735 may store (e.g., based on removing an indication of an address from a register of the cache register component 725) an indication that an address of the cache is available for eviction.

The access location determination component 740 may be configured for determining whether to access information from the cache component 720 or the memory array 710 (e.g., based on a register of the cache register component 725, based on an address map or flag of the cache component 720 or the cache element hold indication component 735). In some examples, the access location determination component 740 may determine to access information from the memory array 710 based on an address associated with a command not being included in a register of the cache register component 725. In some examples, the access location determination component 740 may determine to access information from the cache component 720 based on an address associated with a command being included a register of the cache register component 725.

In some examples, the eviction determination component 745 may identify an address of the cache for an eviction (e.g., based on the access command receiver component 715 receiving a command, based on a register of the cache register component 725). In some examples, the eviction determination component 745 may determine to perform an eviction based on a quantity of entries in a register of the cache register component 725.

In some examples, the data transmitter component 750 may be configured for transmitting information to a host device coupled with the memory device 705 (e.g., based on a command received by the access command receiver component 715).

Figure 8:
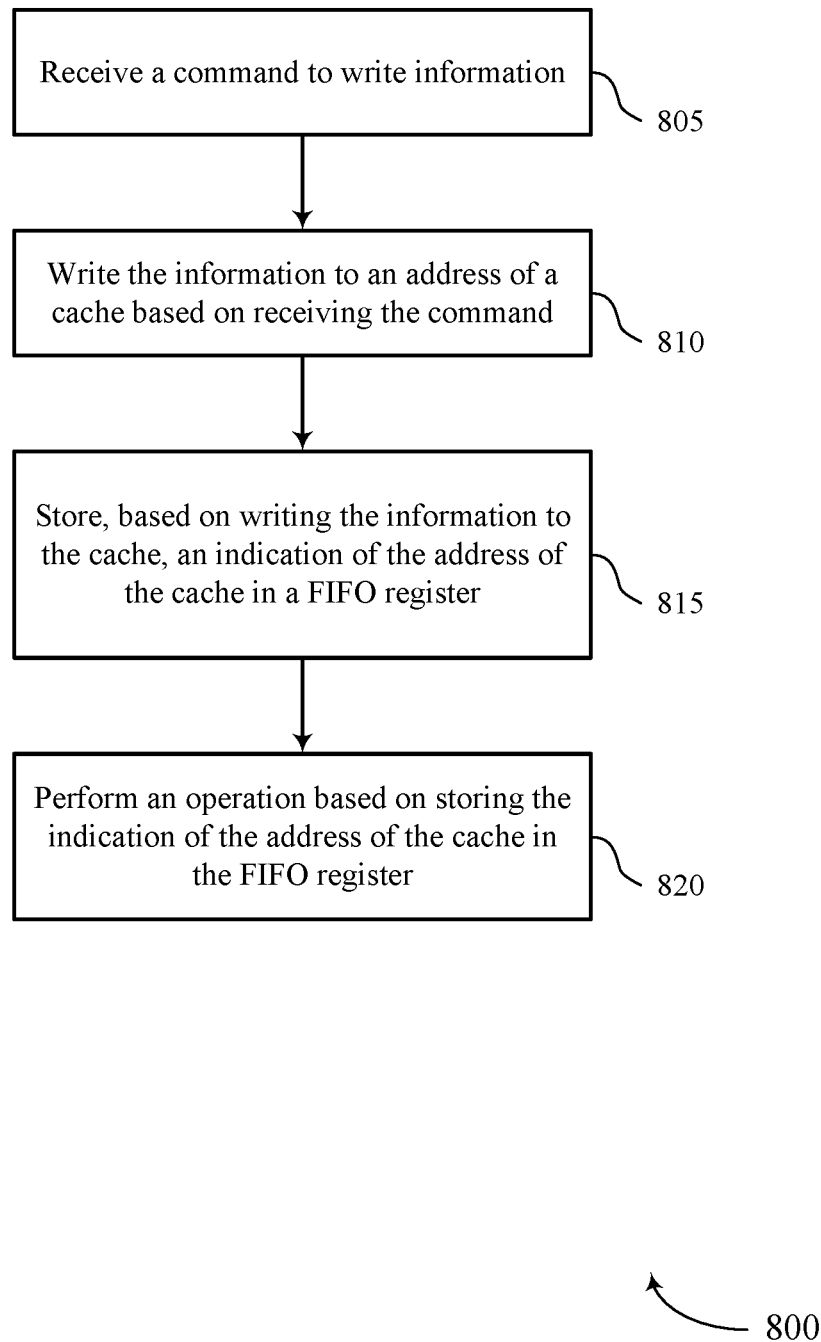
FIGS. 8 and 9 show flowcharts illustrating a method or methods that support cache architectures for memory devices in accordance with examples as disclosed herein.

FIG. 8 shows a flowchart illustrating a method or methods 800 that support cache architectures for memory devices in accordance with aspects of the present disclosure. The operations of method 800 may be implemented by a memory device or its components as described herein. For example, the operations of method 800 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 805, the method 800 may include receiving a command to write information (e.g., to a memory device). The operations of 805 may be performed according to the methods described herein. In some examples, aspects of the operations of 805 may be performed by an access command receiver component as described with reference to FIG. 7.

At 810, the method 800 may include writing the information to an address of a cache (e.g., of the memory device) based on receiving the command. The operations of 810 may be performed according to the methods described herein. In some examples, aspects of the operations of 810 may be performed by a cache component as described with reference to FIG. 7.

At 815, the method 800 may include storing, based on writing the information to the cache, an indication of the address of the cache in a FIFO register (e.g., of the memory device). The operations of 815 may be performed according to the methods described herein. In some examples, aspects of the operations of 815 may be performed by a cache register component as described with reference to FIG. 7.

At 820, the method 800 may include performing an operation (e.g., of the memory device) based on storing the indication of the address of the cache in the FIFO register. The operations of 820 may be performed according to the methods described herein. In some examples, aspects of the operations of 820 may be performed by an access operation component as described with reference to FIG. 7.

In some examples, an apparatus as described herein may perform a method or methods, such as the method 800. The apparatus may include features, means, circuitry, or instructions (e.g., a non-transitory computer-readable medium storing instructions executable by a processor) for receiving a command to write information to the apparatus, writing the information to an address of a cache of the apparatus based on receiving the command, storing, based on writing the information to the cache, an indication of the address of the cache in a FIFO register of the apparatus, and performing an operation (e.g., an access operation) based on storing the indication of the address of the cache in the FIFO register.

Some examples of the method 800 and the apparatus described herein may further include operations, features, means, circuitry, or instructions for writing the information to a memory array (e.g., of the memory device, of the apparatus) based on the command.

Some examples of the method 800 and the apparatus described herein may further include operations, features, means, circuitry, or instructions for storing, based on writing the information to the cache, an indication that the information stored at the address of the cache is to be maintained in the cache.

Some examples of the method 800 and the apparatus described herein may further include operations, features, means, circuitry, or instructions for receiving (e.g., at the memory device, at the apparatus) a second command to write second information (e.g., to the memory device, to the apparatus), and removing the indication of the address from the FIFO register based on receiving the second command.

Some examples of the method 800 and the apparatus described herein may further include operations, features, means, circuitry, or instructions for storing, based on removing the indication of the address from the FIFO register, an indication that the address of the cache is available for eviction.

Some examples of the method 800 and the apparatus described herein may further include operations, features, means, circuitry, or instructions for receiving (e.g., at the memory device, at the apparatus) a third command to read third information (e.g., from the memory device, from the apparatus), and performing the operation may include determining whether to access the third information from the cache or a memory array (e.g., based on the FIFO register, based on an address map or flag of the cache).

In some examples of the method 800 and the apparatus described herein, determining whether to access the third information from the cache or the memory array may include operations, features, means, circuitry, or instructions for determining to access the third information from the memory array based on an address associated with the third command not being included in the FIFO register.

Some examples of the method 800 and the apparatus described herein may further include operations, features, means, circuitry, or instructions for writing the third information from the memory array to a second address of the cache, and storing, based on writing the information from the memory array to the second address of the cache, an indication of the second address of the cache in a second FIFO register of the memory device.

Some examples of the method 800 and the apparatus described herein may further include operations, features, means, circuitry, or instructions for determining to access the third information from the cache based on an address associated with the third command being included in the FIFO register.

Some examples of the method 800 and the apparatus described herein may further include operations, features, means, circuitry, or instructions for removing the indication of the address from the FIFO register based on determining to access the third information from the cache.

Some examples of the method 800 and the apparatus described herein may further include operations, features, means, circuitry, or instructions for receiving (e.g., at the memory device, at the apparatus) a fourth command to write fourth information (e.g., to the memory device, to the apparatus), identifying, for an eviction of the cache, a third address of the cache based on the fourth command and the FIFO register, and writing the fourth information to the cache based on identifying the third address.

Some examples of the method 800 and the apparatus described herein may further include operations, features, means, circuitry, or instructions for determining to perform the eviction based on a quantity of entries in the FIFO register and a quantity of cache lines indicated to be available for eviction, and identifying the third address of the cache for the eviction may be based on determining to perform the eviction.

Some examples of the method 800 and the apparatus described herein may further include operations, features, means, circuitry, or instructions for writing, based on identifying the third address of the cache for the eviction, fifth information from the third address of the cache to a memory array.

Some examples of the method 800 and the apparatus described herein may further include operations, features, means, circuitry, or instructions for storing, based on writing the fifth information to the memory array, an indication of the third address of the cache in the FIFO register.

Some examples of the method 800 and the apparatus described herein may further include operations, features, means, circuitry, or instructions for receiving (e.g., at the memory device, at the apparatus) a fifth command to write sixth information (e.g., to the memory device, to the apparatus), identifying, for an eviction of the cache, a fourth address of the cache based on the fifth command and the FIFO register, and writing the sixth information to the cache based on identifying the fourth address.

Figure 9:
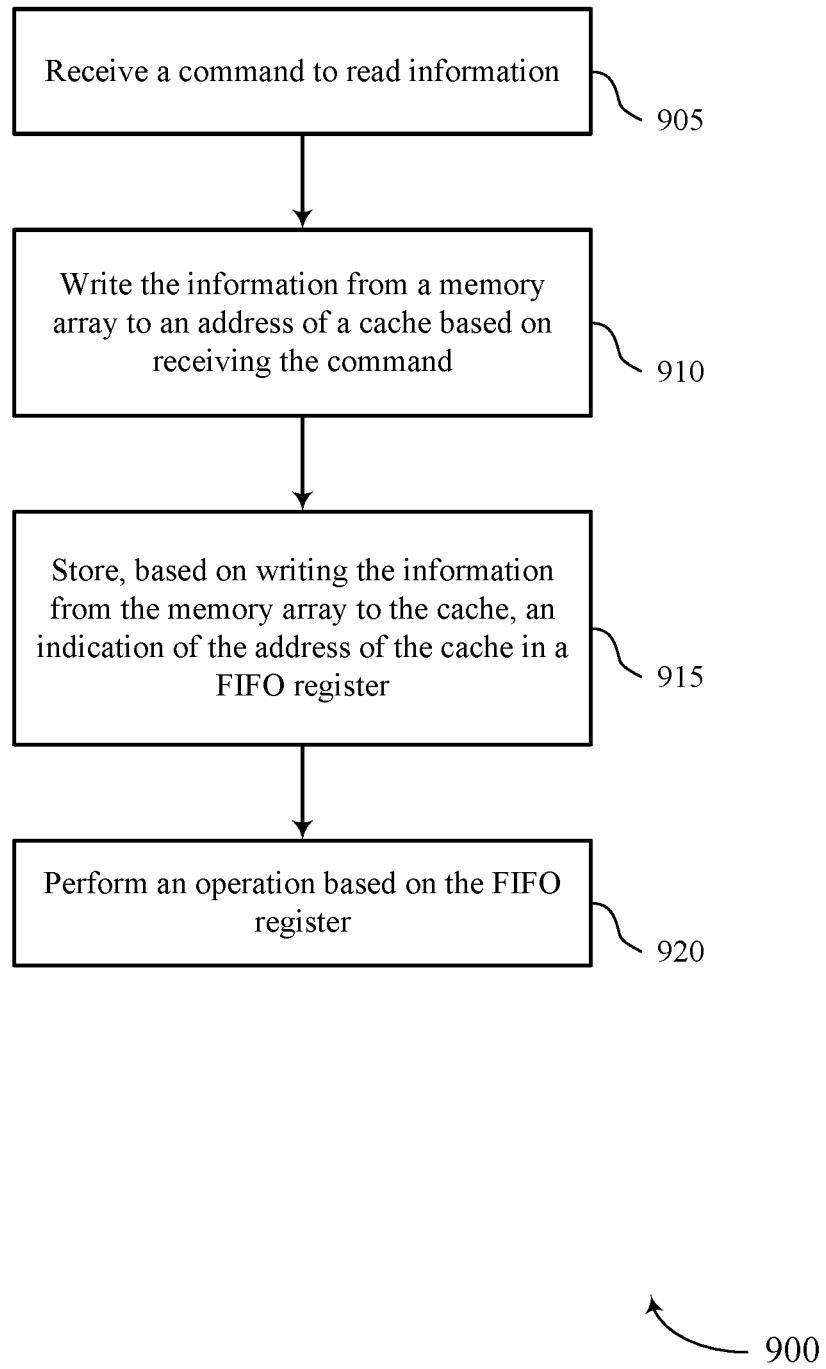

FIG. 9 shows a flowchart illustrating a method or methods 900 that support cache architectures for memory devices in accordance with aspects of the present disclosure. The operations of method 900 may be implemented by a memory device or its components as described herein. For example, the operations of method 900 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 905, the method 900 may include receiving a command to read information (e.g., from a memory device). The operations of 905 may be performed according to the methods described herein. In some examples, aspects of the operations of 905 may be performed by an access command receiver component as described with reference to FIG. 7.

At 910, the method 900 may include writing the information from a memory array (e.g., of the memory device) to an address of a cache (e.g., of the memory device) based on receiving the command. The operations of 910 may be performed according to the methods described herein. In some examples, aspects of the operations of 910 may be performed by a cache component as described with reference to FIG. 7.

At 915, the method 900 may include storing, based on writing the information from the memory array to the cache, an indication of the address of the cache in a FIFO register (e.g., of the memory device). The operations of 915 may be performed according to the methods described herein. In some examples, aspects of the operations of 915 may be performed by a cache register component as described with reference to FIG. 7.

At 920, the method 900 may include performing an operation (e.g., of the memory device) based on the FIFO register. The operations of 920 may be performed according to the methods described herein. In some examples, aspects of the operations of 920 may be performed by an access operation component as described with reference to FIG. 7.

In some examples, an apparatus as described herein may perform a method or methods, such as the method 900. The apparatus may include features, means, circuitry, or instructions (e.g., a non-transitory computer-readable medium storing instructions executable by a processor) for receiving a command to read information from the apparatus, writing the information from a memory array of the apparatus to an address of a cache of the apparatus based on receiving the command, storing, based on writing the information from the memory array to the cache, an indication of the address of the cache in a FIFO register of the apparatus, and performing an operation based on the FIFO register.

Some examples of the method 900 and the apparatus described herein may further include operations, features, means, circuitry, or instructions for transmitting the information to a host device (e.g., coupled with the memory device, coupled with the apparatus) based on the command.

Some examples of the method 900 and the apparatus described herein may further include operations, features, means, circuitry, or instructions for storing, based on writing the information from the memory array to the address of the cache, an indication that the information stored at the address of the cache may be to be maintained in the cache.

Some examples of the method 900 and the apparatus described herein may further include operations, features, means, circuitry, or instructions for receiving a second command to read second information (e.g., from the memory device, from the apparatus), and removing the indication of the address from the FIFO register based on receiving the second command.

Some examples of the method 900 and the apparatus described herein may further include operations, features, means, circuitry, or instructions for storing, based on removing the indication of the address from the FIFO register, an indication that the address of the cache may be available for eviction.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array including a first set of memory cells, a cache including a second set of memory cells, a FIFO register, and a control component coupled with the memory array, the cache, and the FIFO register. The control component may be configured to cause the apparatus to receive a command to write information to the apparatus, write the information to an address of the cache based on receiving the command, store, based on writing the information to the cache, an indication of the address of the cache in the FIFO register, and perform an operation based on storing the indication of the address of the cache in the FIFO register.

In some examples, the control component may be further configured to cause the apparatus to write the information to the memory array based on the command.

In some examples, the control component may be further configured to cause the apparatus to store, based on writing the information to the cache, an indication that the information stored at the address of the cache is to be maintained in the cache.

In some examples, the control component may be further configured to cause the apparatus to receive a second command to write second information to the apparatus, and remove the indication of the address from the FIFO register based on receiving the second command.

In some examples, the control component may be further configured to cause the apparatus to store, based on removing the indication of the address from the FIFO register, an indication that the address of the cache is available for eviction.

In some examples, the control component may be further configured to cause the apparatus to receive a third command to read third information from the apparatus, and, to perform the operation, the control component may be configured to cause the apparatus to determine whether to access the third information from the cache or the memory array (e.g., based on the FIFO register, based on an address map or flag of the cache).

In some examples, to determine whether to access the third information from the cache or the memory array, the control component may be configured to cause the apparatus to determine to access the third information from the memory array based on an address associated with the third command not being included in the FIFO register.

In some examples, the control component may be further configured to cause the apparatus to write the third information from the memory array to a second address of the cache, and store, based on writing the third information from the memory array to the second address of the cache, an indication of the second address of the cache in a second FIFO register of the apparatus.

In some examples, to determine whether to access the third information from the cache or the memory array, the control component may be configured to cause the apparatus to determine to access the third information from the cache based on an address associated with the third command being included in the FIFO register.

In some examples, the control component may be further configured to cause the apparatus to remove the indication of the address from the FIFO register based on determining to access the third information from the cache.

In some examples, the control component may be further configured to cause the apparatus to receive a fourth command to write fourth information to the apparatus, identify, for an eviction of the cache, a third address of the cache based on the fourth command and the FIFO register, and write the fourth information to the cache based on identifying the third address.

In some examples, the control component may be further configured to cause the apparatus to determine to perform the eviction based on a quantity of entries in the FIFO register and a quantity of cache lines indicated to be available for eviction, and identify the third address of the cache for the eviction based on determining to perform the eviction.

In some examples, the control component may be further configured to cause the apparatus to write, based on identifying the third address of the cache for the eviction, fifth information from the third address of the cache to the memory array.

In some examples, the control component may be further configured to cause the apparatus to store, based on writing the fifth information to the memory array, an indication of the third address of the cache in the FIFO register.

In some examples, the control component may be further configured to cause the apparatus to operate the FIFO register with a quantity of entries that is based on a target duration between successive accessing of an address of the memory array and an access command interval of the apparatus.

In some examples, the first set of memory cells include non-volatile storage elements, and the second set of memory cells include volatile storage elements.

Another apparatus is described. The apparatus may include a memory array including a first set of memory cells, a cache including a second set of memory cells, a FIFO register, and a control component coupled with the memory array, the cache, and the FIFO register. The control component may be configured to cause the apparatus to receive a command to read information in the apparatus, write the information from the memory array to an address of the cache based on receiving the command, store, based on writing the information from the memory array to the address of the cache, an indication of the address of the cache in the FIFO register, and perform an operation based on storing the indication of the address of the cache in the FIFO register.

In some examples, the control component may be further configured to cause the apparatus to transmit the information to a host device coupled with the apparatus based on the command.

In some examples, the control component may be further configured to cause the apparatus to store, based on writing the information from the memory array to the address of the cache, an indication that the information stored at the address of the cache is to be maintained in the cache.

In some examples, the control component may be further configured to cause the apparatus to receive a second command to read second information from the apparatus, and remove the indication of the address from the FIFO register based on receiving the second command.

In some examples, the control component may be further configured to cause the apparatus to store, based on removing the indication of the address from the FIFO register, an indication that the address of the cache may be available for eviction.

In some examples, the first set of memory cells includes non-volatile storage elements, and the second set of memory cells includes volatile storage elements.

Another apparatus is described. The apparatus may include a memory array including a first set of memory cells, a cache including a second set of memory cells, a FIFO register, and a control component coupled with the memory array, the cache, and the FIFO register. The control component may be operable to store an indication of an address of the cache based on accessing the memory array.

A non-transitory computer-readable medium is described. The non-transitory computer-readable medium may store code including instructions which, when executed by a processor of an electronic device, cause the electronic device to receive a command to write information to the electronic device, write the information to an address of a cache of the electronic device based at least in part on receiving the command, store, based at least in part on writing the information to the cache, an indication of the address of the cache in a FIFO register of the electronic device, and perform an operation of the electronic device based at least in part on storing the indication of the address of the cache in the FIFO register.

In some examples of the non-transitory computer-readable medium, the instructions, when executed by the processor of the electronic device, further cause the electronic device to write the information to a memory array of the electronic device based at least in part on the command.

In some examples of the non-transitory computer-readable medium, the instructions, when executed by the processor of the electronic device, further cause the electronic device to store, based at least in part on writing the information to the cache, an indication that the information stored at the address of the cache is to be maintained in the cache.

In some examples of the non-transitory computer-readable medium, the instructions, when executed by the processor of the electronic device, further cause the electronic device to receive a second command to write second information to the electronic device, and remove the indication of the address from the FIFO register based at least in part on receiving the second command.

In some examples of the non-transitory computer-readable medium, the instructions, when executed by the processor of the electronic device, further cause the electronic device to store, based at least in part on removing the indication of the address from the FIFO register, an indication that the address of the cache is available for eviction.

In some examples of the non-transitory computer-readable medium, the instructions, when executed by the processor of the electronic device, further cause the electronic device to receive a third command to read third information from the electronic device. In some examples, to perform the operation of the electronic device, the instructions, when executed by the processor of the electronic device, cause the electronic device to determine whether to access the third information from the cache based at least in part on the FIFO register.

In some examples of the non-transitory computer-readable medium, the instructions, when executed by the processor of the electronic device, further cause the electronic device to receive a fourth command to write fourth information to the electronic device, identify, for an eviction of the cache, a third address of the cache based at least in part on the fourth command and the FIFO register, and write the fourth information to the cache based at least in part on identifying the third address.

A non-transitory computer-readable medium is described. The non-transitory computer-readable medium may store code including instructions which, when executed by a processor of an electronic device, cause the electronic device to receive a command to read information from the electronic device, write the information from a memory array of the electronic device to an address of a cache of the electronic device based at least in part on receiving the command, store, based at least in part on writing the information from the memory array to the address of the cache, an indication of the address of the cache in the FIFO register, and perform an operation of the electronic device based at least in part on storing the indication of the address of the cache in the FIFO register.

In some examples of the non-transitory computer-readable medium, the instructions, when executed by the processor of the electronic device, further cause the electronic device to transmit the information to a host device coupled with the electronic device based at least in part on the command.

In some examples of the non-transitory computer-readable medium, the instructions, when executed by the processor of the electronic device, further cause the electronic device to store, based at least in part on writing the information from the memory array to the address of the cache, an indication that the information stored at the address of the cache is to be maintained in the cache.

In some examples of the non-transitory computer-readable medium, the instructions, when executed by the processor of the electronic device, further cause the electronic device to receive a second command to read second information from the electronic device, and remove the indication of the address from the FIFO register based at least in part on receiving the second command.

In some examples of the non-transitory computer-readable medium, the instructions, when executed by the processor of the electronic device, further cause the electronic device to store, based at least in part on removing the indication of the address from the FIFO register, an indication that the address of the cache is available for eviction.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory device, comprising:
   a memory array comprising a first set of memory cells;
   a cache comprising a second set of memory cells; and
   one or more processors coupled with the memory array and the cache, the one or more processors configured to cause the memory device to:
      write information to the memory array and to an address of the cache;
      store, based at least in part on the writing, an indication that the address of the cache is not available for eviction;
      perform a quantity of access operations on the memory array after storing the indication; and
      remove the indication that the address of the cache is not available for eviction based at least in part on the quantity of access operations performed on the memory array after storing the indication being greater than a threshold quantity of access operations.

2. The memory device of claim 1, wherein the one or more processors are further configured to cause the memory device to:
   store, based at least in part on the quantity of access operations performed on the memory array after storing the indication being greater than the threshold quantity of access operations, a second indication that the address of the cache is available for eviction.

3. The memory device of claim 1, wherein:
   to store the indication that the address of the cache is not available for eviction, the one or more processors are configured to cause the memory device to store an indication of the address of the cache in a register of the memory device; and
   to remove the indication that the address of the cache is not available for eviction, the one or more processors are configured to cause the memory device to remove the indication of the address of the cache from the register.

4. The memory device of claim 3, wherein the one or more processors are further configured to cause the memory device to:
   remove a second indication of a second address from the register if the register is storing a quantity of indications equal to a capacity of the register; and
   store the indication of the address of the cache based at least in part on removing the second indication of the second address.

5. The memory device of claim 4, wherein the capacity of the register is based at least in part on a duration between successive accessing of an address of the memory array and an access interval of the memory array.

6. The memory device of claim 3, wherein an absence of the indication of the address of the cache in the register indicates that the address of the cache is available for eviction.

7. The memory device of claim 1, wherein the threshold quantity of access operations is determined based at least in part on a duration between successive accessing of an address of the memory array.

8. The memory device of claim 1, wherein the one or more processors are further configured to cause the memory device to:
   store, based at least in part on the writing, a second indication that the information is to be maintained in the cache.

9. The memory device of claim 1, wherein the one or more processors are further configured to cause the memory device to:
   receive a write command, wherein the writing is based at least in part on receiving the write command.

10. The memory device of claim 1, wherein the one or more processors are further configured to cause the memory device to:
    receive a second write command, wherein removing the indication is based at least in part on receiving the second write command.

11. The memory device of claim 1, wherein the one or more processors are further configured to cause the memory device to:
    read second information from the memory array;
    write the second information to a second address of the cache; and
    store, based at least in part on the reading, a second indication that the second address of the cache is not available for eviction.

12. The memory device of claim 11, wherein the one or more processors are further configured to cause the memory device to:
    store the indication in a first register associated with a first access delay; and
    store the second indication in a second register associated with a second access delay that is different than the first access delay.

13. The memory device of claim 1, wherein the threshold quantity of access operations is based at least in part on a duration between successive accessing of an address of the memory array.

14. A memory device, comprising:
    a memory array comprising a first set of memory cells;
    a cache comprising a second set of memory cells; and
    one or more processors coupled with the memory array and the cache, the one or more processors configured to cause the memory device to:
       read information from the memory array;
       write the information to an address of the cache based at least in part on reading the information from the memory array;
       store, based at least in part on reading the information from the memory array, an indication that the address of the cache is not available for eviction;
       perform a quantity of access operations on the memory array after storing the indication; and
       remove the indication that the address of the cache is not available for eviction based at least in part on the quantity of access operations performed on the memory array after storing the indication being greater than a threshold quantity of access operations.

15. The memory device of claim 14, wherein the one or more processors are further configured to cause the memory device to:
    store, based at least in part on the quantity of access operations performed on the memory array after storing the indication, a second indication that the address of the cache is available for eviction.

16. The memory device of claim 14, wherein:
    to store the indication that the address of the cache is not available for eviction, the one or more processors are configured to cause the memory device to store an indication of the address of the cache in a register of the memory device; and to remove the indication that the address of the cache is not available for eviction, the one or more processors are configured to cause the memory device to remove the indication of the address of the cache from the register.

17. The memory device of claim 16, wherein the one or more processors are further configured to cause the memory device to:

remove a second indication of a second address from the register if the register is storing a quantity of indications equal to a capacity of the register; and store the indication of the address of the cache based at least in part on removing the second indication of the second address.

18. The memory device of claim 14, wherein the one or more processors are further configured to cause the memory device to:

receive a read command, wherein reading the information from the memory array and writing the information to an address of the cache is based at least in part on receiving the read command.

19. memory device, comprising:

a memory array comprising a first set of memory cells;

a cache comprising a second set of memory cells; and one or more processors coupled with the memory array and the cache, the one or more processors operable to cause the memory device to:

synchronize information of a first address of the memory array and a second address of the cache based at least in part on accessing the first address of the memory array;

perform a quantity of access operations on the memory array based at least in part on synchronizing the information; and evict the information from the second address of the cache based at least in part on the quantity of access operations performed on the memory array after synchronizing the information exceeding a threshold quantity of access operations.

20. The memory device of claim 19, wherein the one or more processors are further operable to cause the memory device to:

refrain from accessing the first address of the memory array until after the quantity of access operations performed on the memory array after synchronizing the information have satisfied the threshold quantity of access operations.

21. The memory device of claim 19, wherein the threshold quantity of access operations is based at least in part on whether the accessing of the first address of the memory array of the synchronizing is associated with a read operation of the first address of the memory array or with a write operation of the first address of the memory array.

* * * * *